(12) United States Patent
Cai et al.

(10) Patent No.: US 8,572,295 B1
(45) Date of Patent: Oct. 29, 2013

(54) BUS TRAFFIC PROFILING

(75) Inventors: Wenwei Cai, Shanghai (CN); Zhenhua Wu, Shanghai (CN)

(73) Assignee: Marvell International Ltd., Hamilton (BM)

( * ) Notice: Subject to any disclaimer, the term of this patent is extended or adjusted under 35 U.S.C. 154(b) by 1253 days.

(21) Appl. No.: 12/033,677

(22) Filed: Feb. 19, 2008

Related U.S. Application Data

(60) Provisional application No. 60/890,330, filed on Feb. 16, 2007.

(51) Int. Cl.
*G06F 3/00* (2006.01)
*G06F 9/44* (2006.01)

(52) U.S. Cl.
USPC .............. 710/15; 710/260; 717/127; 717/131

(58) Field of Classification Search
USPC .............. 710/15, 260, 268, 269; 714/37, 127; 717/127, 128, 129, 131
See application file for complete search history.

(56) References Cited

U.S. PATENT DOCUMENTS

| | | | | |
|---|---|---|---|---|
| 5,446,876 A * | 8/1995 | Levine et al. | ................ | 714/47.3 |
| 5,557,548 A * | 9/1996 | Gover et al. | ................ | 702/176 |
| 5,684,945 A * | 11/1997 | Chen et al. | ................ | 714/20 |
| 5,819,053 A * | 10/1998 | Goodrum et al. | ................ | 710/100 |
| 5,878,208 A * | 3/1999 | Levine et al. | ................ | 714/38.13 |
| 5,903,730 A * | 5/1999 | Asai et al. | ................ | 709/224 |
| 6,480,809 B1 * | 11/2002 | Slaight | ................ | 702/186 |
| 6,678,883 B1 * | 1/2004 | Berry et al. | ................ | 717/128 |
| 7,133,805 B1 * | 11/2006 | Dankenbring et al. | ........ | 702/186 |
| 7,246,045 B1 * | 7/2007 | Rappaport et al. | ................ | 703/2 |
| 7,257,513 B2 * | 8/2007 | Lilly | ................ | 702/182 |
| 7,444,263 B2 * | 10/2008 | White et al. | ................ | 702/180 |
| 7,472,039 B2 * | 12/2008 | Yamamura et al. | ........... | 702/186 |
| 7,870,455 B2 * | 1/2011 | Mayer | ................ | 714/734 |
| 2003/0204650 A1 * | 10/2003 | Ganasan et al. | ................ | 710/15 |
| 2004/0168005 A1 * | 8/2004 | Civlin | ................ | 710/260 |
| 2005/0071516 A1 * | 3/2005 | Levine et al. | ................ | 710/1 |
| 2005/0155018 A1 * | 7/2005 | DeWitt et al. | ................ | 717/124 |
| 2005/0167486 A1 * | 8/2005 | Horikawa et al. | ................ | 235/380 |
| 2007/0093986 A1 * | 4/2007 | Armstead et al. | ............. | 702/182 |
| 2008/0189687 A1 * | 8/2008 | Levine et al. | ................ | 717/128 |

\* cited by examiner

*Primary Examiner* — Khanh Dang

(57) ABSTRACT

Methods and systems for analyzing bus traffic in a target device, such as a system on-a-chip (SOC) comprises capturing a processor event and generating an interrupt based on a threshold associated with the processor event. Based on at least the interrupt, a instruction pointer associated with the processor event that generated the interrupt is identified. An instruction analyzer identifies a memory address of the instruction associated with the processor event that generated the interrupt. At least the processor event and a associated instruction information are collected by a sample collector and transferred to a host for performance profiling.

16 Claims, 5 Drawing Sheets

BUS TRAFFIC PROFILING

RELATED APPLICATIONS

This application claims the benefit of priority to U.S. Provisional Application No. 60/890,330 filed Feb. 16, 2007, titled "The Methodology of Bus Traffic Profiling," which is incorporated herein by reference in its entirety.

FIELD

The present invention is generally related to profiling traffic on a system bus within a system on a chip (SoC) and, more specifically, methods and systems for identifying performance bottlenecks occurring on a system bus within an SoC.

BACKGROUND

Highly integrated SoCs are common processing components in systems and devices used in end-user segments, including automotive integrated circuits, consumer electronics, voice and data communication equipment, and military applications. Such devices often integrate common analog and digital functions on a single-chip, single-die solution. Some baseband processors designed for mobile phones, for example, combine an image processor, an audio synthesizer, a video encoder/decoder, a display controller, and a radio frequency (RF) transceiver on a single, monolithic piece of silicon. Highly integrated SoCs may offer increased performance from a smaller die area, reduced power consumption, and lowered manufacturing costs compared to using multiple single-chip solutions to perform the same functions. However, as the performance of the individual device elements within the SoC increases, the interconnection between the respective device elements may limit the overall chip performance.

When the amount of information transferred between these integrated device elements increases, the system bus within the SoC becomes congested and less efficient, degrading the overall performance of the device. Performance monitoring tools, such as those used in central processor unit (CPU) architectures, may be used to identify performance bottlenecks and to help optimize the SoC system bus performance. These tools, however, have traditionally focused on profiling an application's performance with regard to the CPU and memory subsystem. Monitoring the SoC system bus creates additional challenges because the SoC system bus is typically not visible to the application. Therefore, there is a need to provide a comprehensive SoC system bus performance profiler to enable the identification of system performance bottlenecks.

SUMMARY

In accordance with some embodiments of the invention, a method for bus analyzing in a system on a chip comprises capturing a processor event from a bus on the system on a chip; generating an interrupt based on a threshold associated with the processor event; collecting instruction information associated with the processor event that generated the interrupt; and transferring the processor event and the instruction information to a host.

A method for generating a performance profile of system bus traffic on a target device comprises receiving a plurality of processor events and a plurality of associated instruction information; associating a device element from a plurality of device elements with each of the plurality of processor events based on the instruction information associated with each processor event; generating a destination address data size pair associated with each device element; and displaying an actual system bus performance profile based on the destination address data size pairs.

A system for profiling bus performance in a target device comprises a performance monitoring unit for capturing a plurality of processor events; an interrupt service routine for identifying an instruction pointer associated with a processor event that generated an interrupt; an instruction analyzer for determining a memory address of an instruction associated with the interrupt based on the instruction pointer; and a sample collector for receiving at least the processor event that generated the interrupt from the interrupt service routine and associated instruction information from the instruction analyzer.

A system for profiling bus performance in a target device may further comprise a system peripheral mapper for providing a device address of a device element associated with the interrupt and the associated instruction information based on a device database; a system bus traffic analyzer for generating a comparison of a model system bus performance profile with an actual system bus performance profile based on a plurality of outputs of the system peripheral mapper; and a display for displaying the comparison of the model system bus performance profile to the actual system bus performance profile.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and, together with the description, serve to explain the principles of the invention.

DESCRIPTION OF THE EMBODIMENTS

Reference will now be made in detail to the exemplary embodiments implemented consistent with the invention, the examples of which are illustrated in the accompanying drawings. Wherever possible, the same reference numbers will be used throughout the drawings to refer to the same or like parts.

Figure 1:
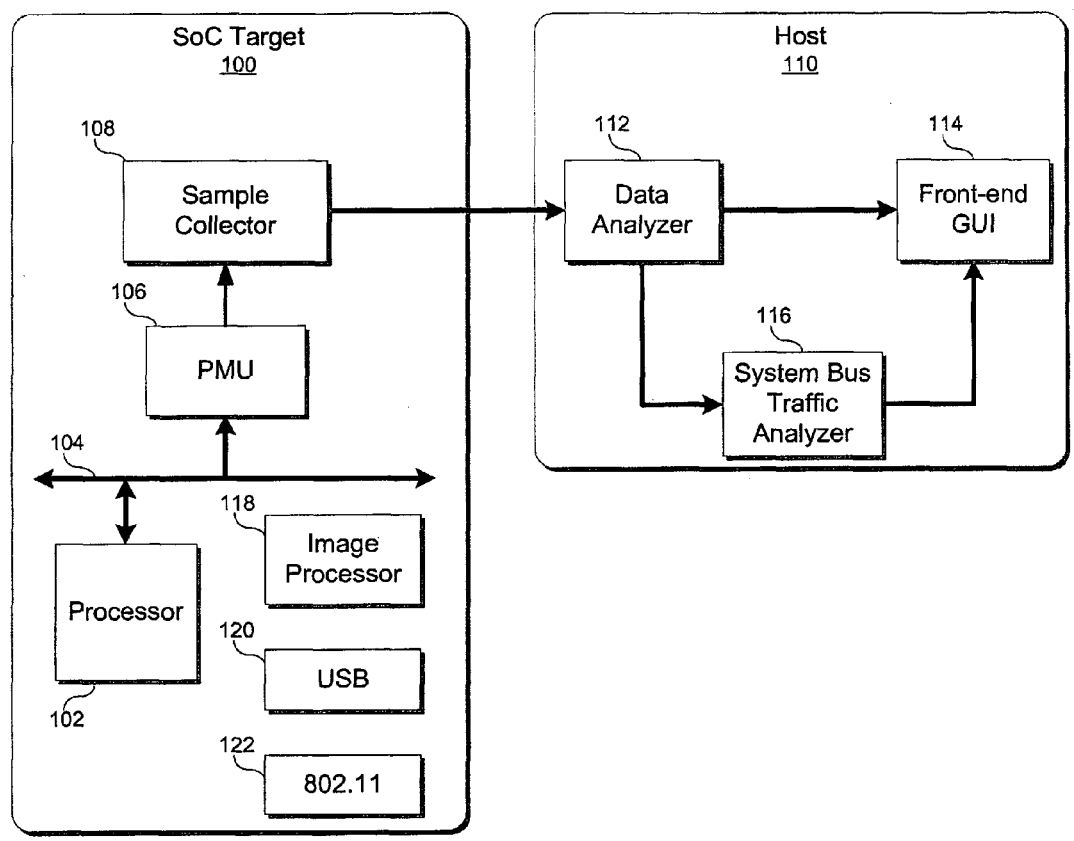
FIG. 1 illustrates a block diagram of an exemplary system using a system bus profiling methodology consistent with some embodiments of the present invention.

FIG. 1 illustrates a block diagram of an exemplary system using a system bus profiling methodology consistent with some embodiments of the present invention. An SoC target 100 consistent with the present invention may be a single integrated circuit, i.e., one substrate, that can include functions that previously have been manifested on separate integrated circuits. SoC target 100 may include, for example, processor 102, image processor 118, USB PHY and controller 120, and 802.11 radio and baseband processor 122. Processor 102 may include any type of processor capable of providing the performance and functionality required by embodiments consistent with the present invention. Processor 102 may include, for example, a digital signal processor (DSP), network processor, embedded processor, micro-controller, input/output (I/O) processor (IOP), and similar devices.

As shown In FIG. 1, exemplary SoC target 100 contains performance monitoring unit (PMU) 106 and sample collector 108. PMU 106 and sample collector 108 may be implemented in hardware within a microprocessor or similar device, or as separate hardware devices. Alternatively, PMU 106 and sample collector 108 may be implemented in software or a combination of hardware and software.

Sample collector 108 is operatively coupled to PMU 106 and host 110, managing traffic between SoC target 100 and host 110. Sample collector 108 may be coupled to SoC target 100 and host 110 using one of a variety of standard wired or wireless connections, including Universal Serial Bus (USB), Firewire, and 802.11g/n.

Host 110 may be any processor-based system that includes at least a processor and a main memory, such as a desktop computer, a server, a work station, a mainframe, or a system of networked-computers. As shown, exemplary host 110 includes data analyzer 112, front-end graphical user interface (GUI) 114, and system bus traffic analyzer 116, each of which may be implemented in hardware, software, or a combination of hardware and software.

Figure 3:
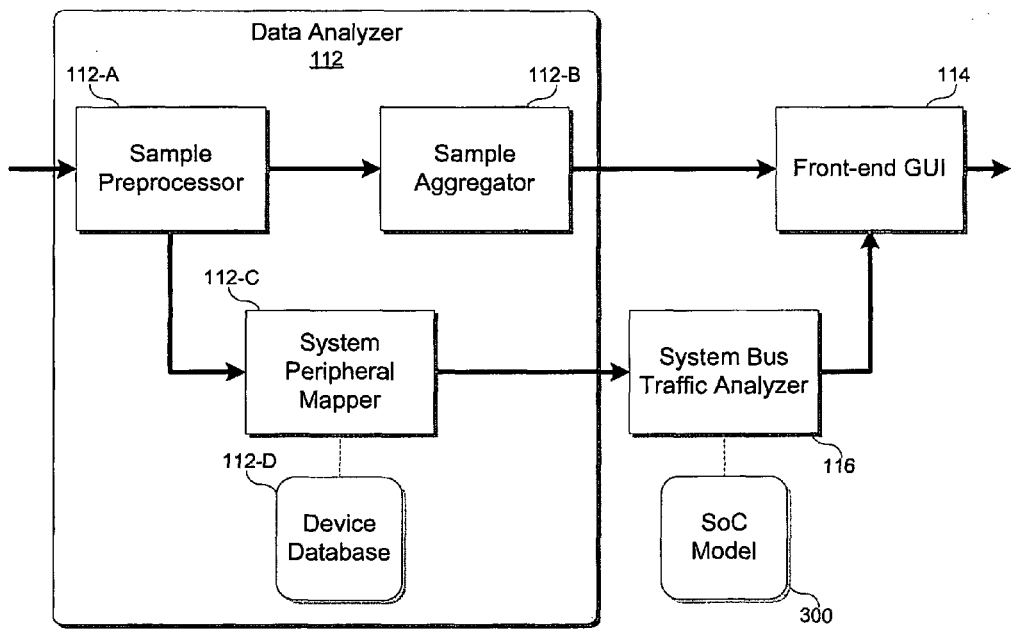
FIG. 3 illustrates a block diagram of an exemplary host system using a system bus profiling methodology consistent with some embodiments of the present invention.

Data analyzer 112 gathers samples and corresponding instruction addresses from SoC target 100 for events captured by PMU 106. Using information received from PMU 106, data analyzer 112 transfers samples from PMU 106 to front-end GUI 114. Data analyzer 112 also outputs a mapping of the data and device information associated with each trigger event. System bus traffic analyzer 116 receives the mapping information and generates a performance profile of system bus 104 within target SoC 100. A system performance profile may be generated by, for example, comparing actual bus traffic with SoC model 300, as shown in FIG. 3. The modeled bus traffic in SoC model 300 represents a theoretical peak throughput of system bus 104 based on the specific composition of device elements within target SoC 100. The actual bus traffic profile generated by system bus traffic analyzer 116 provides a representation of the required bus throughput for the current application over time. The output of system bus traffic analyzer 116 is displayed along with the sample information using front-end GUI 114. By comparing how closely the actual bus traffic matches the modeled bus traffic, potential performance bottlenecks within target SoC 100 may be identified using front-end GUI 114. For example, based on SoC model 300, system bus 104 has an expected peak throughput of 100 MB/s. The actual bus profile, provided by system bus traffic analyzer, however, may indicate a system bus throughput of 80 MB/s. Here, the actual bus profile may include a sampling of several events, comprised of destination device address and the associated data size. The actual bus profile may be displayed along with SoC model 300 and sampled events from sample aggregator 112-B in various graphical, tabular, or similar formats facilitating visual or computational comparison using front-end GUI 114.

Figure 2:
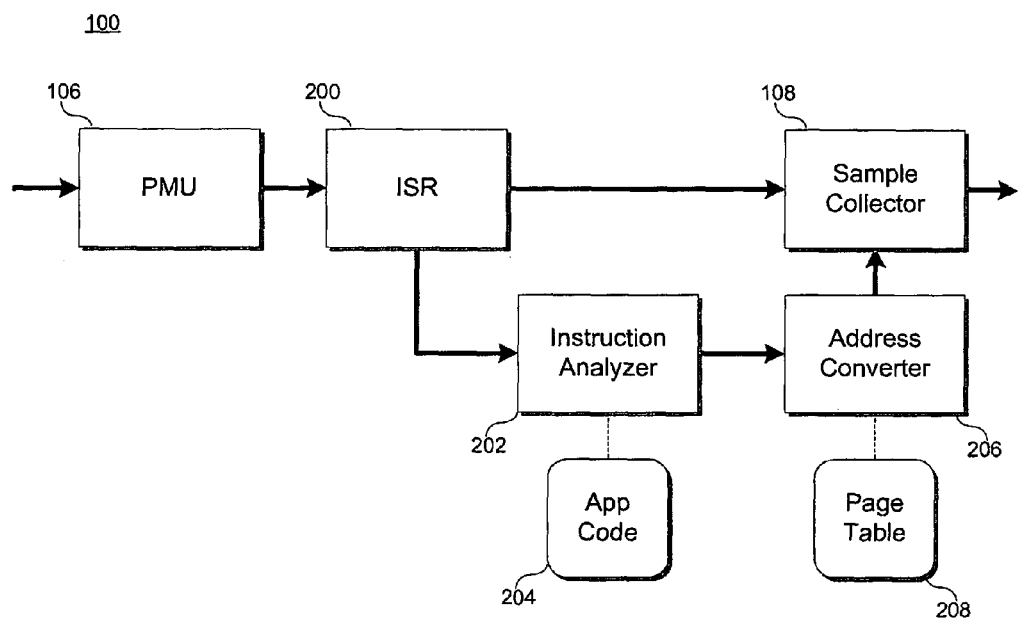
FIG. 2 illustrates a block diagram of an exemplary target device using a system bus profiling methodology consistent with some embodiments of the present invention.

FIG. 2 illustrates a block diagram of an exemplary target device using a system bus profiling methodology consistent with at least one embodiment of the present invention. Performance monitoring unit (PMU) 106 monitors the performance of system bus 104 on SoC target 100. PMU 106 may be configured to monitor and evaluate events, including event ratios or a combination of events and event ratios based on the user-defined thresholds. In some embodiments, events identified for monitoring may be written to a register by a PMU driver. An event may be a single action or a specific number of actions performed by a processor or an SoC in response to executing a specific portion of code. An event may include, for example, a clock cycle, a cache miss, and a memory-related processor stall. By monitoring events, potential problems that may affect system performance may be identified. In some cases, the severity of a potential performance problem may be determined by monitoring a particular event ratio. An event ratio measures the number of occurrences of a specific event with respect to another value. For example, instructions per cycle is a measure of the number of retired instructions that occurred during a single clock cycle. Event ratios, such as instructions per cycle may be used to measure efficiency or memory bandwidth. For example, the number of first level cache misses compared to the total number of memory access instructions executed that satisfy a pre-defined threshold or range of values can be monitored. The thresholds may determine the sample period by causing PMU 106 to sample an event periodically based on user-defined limits for the specific event. Threshold values may include a specified number of occurrences stored in a counter register, a ratio, or a range of values. PMU 106 samples the event and, when a threshold is satisfied or the event occurs, generates an interrupt.

Interrupt service Routing (ISR) 200 provides an instruction address and associated context information based on the interrupt and sample information received from PMU 106. In some embodiments, once an interrupt is received from PMU 106, ISR 200 saves the context information, which may include program counter (i.e. instruction pointer) value, process ID, relative virtual address, module handle, and trace buffer. The process ID may be used by the operating system running on target SoC 100 to uniquely specify a particular process. The relative virtual address of the interrupted instruction may be derived from the module load-in address. In some embodiments, a module may include all object files or program files within the file system. The module may be stored in app code 204. The module load-in address may be determined prior to loading the module into memory within SoC target 100. In some embodiments, the module may be stored in memory external to SoC target 100, including but not limited to memory physically implemented by computer readable media, implemented in a network, or implemented as part of a computer system. The instruction pointer may be a register within target SoC 100 that indicates the address of the instruction executed prior to the instruction generating the interrupt. The instruction pointer is passed to instruction analyzer 202 to determine which instruction is associated with each interrupt.

Instruction analyzer 202 provides the data size, the data address, and the instruction address associated with each interrupt captured by ISR 200. The event, process information, context information, and relative virtual address of the interrupted instruction are received from ISR 200. Based on the process information, instruction analyzer 202 analyzes app code 204, along with the instruction pointer, to identify the interrupted instruction. In cases, where the interrupted instruction is a load or store instruction, instruction analyzer 202 may identify the data address and data size associated with the interrupted instruction. For example, in some embodiments, app code 204 may include the following exemplary code sequence and register values:

| Instruction pointer: | Ldrb r0, [r1, #4] |
| | Add r0, r0, #4 |
| Registers: | r1: 0x08000 |

Here, the value of r1 may be included in the context information provided by ISR 200. By analyzing the code sequence, instruction analyzer 202, may determine the data address of 0x8000+4 with an associated data size of one byte.

Address converter 206 receives the virtual address from instruction analyzer 202 and converts the virtual address into a physical address based on page table 208. In some embodiments, page table 208 may includes a mapping of the virtual address space assigned by the operation system to the associated physical address space.

FIG. 3 illustrates a block diagram of an exemplary host system using a system bus profiling methodology consistent with at least one embodiment of the present invention. In FIG. 3, sample preprocessor 112-A receives samples and their associated data addresses and data sizes from SoC target 100. Sample preprocessor 112-A separates the samples from the incoming data stream, routing sample information to sample aggregator 112-B and the corresponding data address and data size to system peripheral mapper 112-C. In some embodiments, sample preprocessor 112-A may include a common data parser. Sample aggregator 112-B collects sample information corresponding to each event captured by PMU 106 that triggered an interrupt. In some embodiments, sample aggregator 112-B may be used by front-end GUI 114 to correlate individual event samples with profile data provided by system bus traffic analyzer 116. System peripheral mapper 112-C uses the physical data address associated with each sampled event and device database 112-D to determine the destination device element within SoC target 100 of the data associated with each sampled event. Device database 112-D may include a list of devices within SoC target 100 and their corresponding physical addresses. By comparing the device addresses listed in device database 112-D and the data address of each sampled event, system peripheral mapper 112-C can identify each destination device element corresponding to the received data address.

System bus traffic analyzer 116 generates a performance profile of system bus 104 based on each destination address and data size pair from system peripheral mapper 112-C. The profile is generated by sampling each destination address data size pair and generating a bus throughput metric based on the sampled input. In some embodiments, a comparison between the actual system bus 104 profile and the model system bus profile may be determined based on SoC model 300 as previously discussed. Using front-end GUI 114, data received from system bus traffic analyzer 116 may be displayed alone or in combination with sample events gathered by sample aggregator 112-B. Front-end GUI 114 may employ menus, drop down menus, icons and/or point-and-click interfaces via the display and/or user input.

Figure 4:
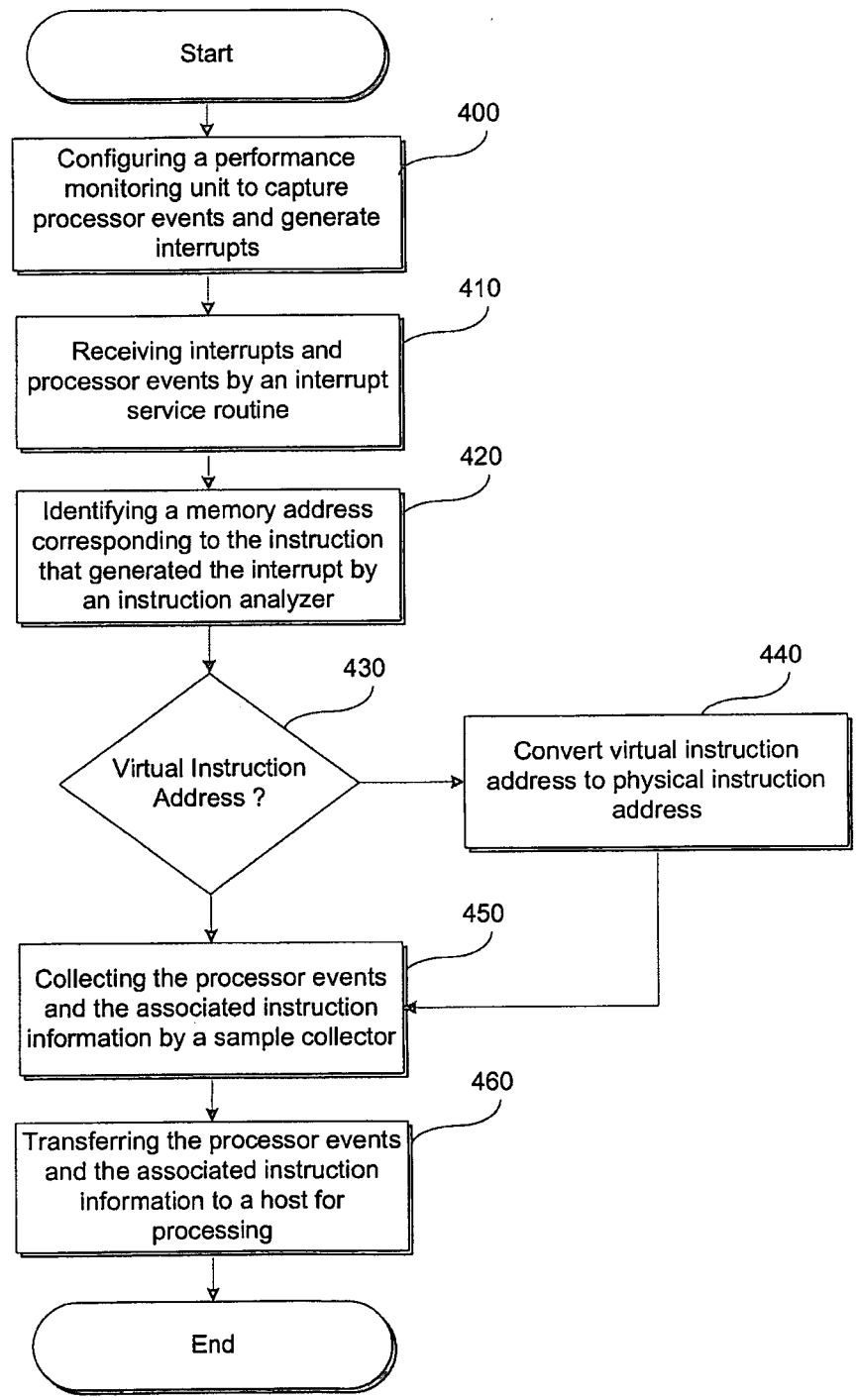
FIG. 4 illustrates a flow chart of an exemplary method of capturing a performance profile of bus traffic consistent with some embodiments of the present invention.

FIG. 4 illustrates a flow chart of an exemplary method of capturing a performance profile of bus traffic in a semiconductor device consistent with at least one embodiment of the present invention. In step 400, a performance monitoring unit (PMU) 106 is configured to capture specific processor events. In some embodiments, a user may configure PMU 106 to monitor specific events, such as cache misses. In other embodiments, PMU 106 may be configured to monitor event ratios, such as hit rate or bandwidth, to determine the frequency of a particular event or set of events.

In step 410, interrupt service routine 200 receives the processor event samples and the associated interrupts from performance monitoring unit 106. In step 420, instruction analyzer 202 receives the interrupt captured in step 410 and determines the memory address corresponding to the instruction that generated the interrupt. In some embodiments, the output of step 420 is a virtual memory address of the instruction associated with the interrupt.

In step 430, address converter 206 determines if the address received from the output of step 420 is a virtual or a physical address. In step 440, address converter 206 converts the virtual memory address received from instruction analyzer 202 to a physical memory address based on page table 208. In step 450, sample collector 108 receives processor events from interrupt service routine 200 and instruction information from address converter 206 or instruction analyzer 202. In step 460, sample collector 108 transfers the processor events and the instruction information to host 110 for processing. Sample collector 108 may transfer the information to host 110 using one of a variety of wired or wireless connection standards.

Figure 5:
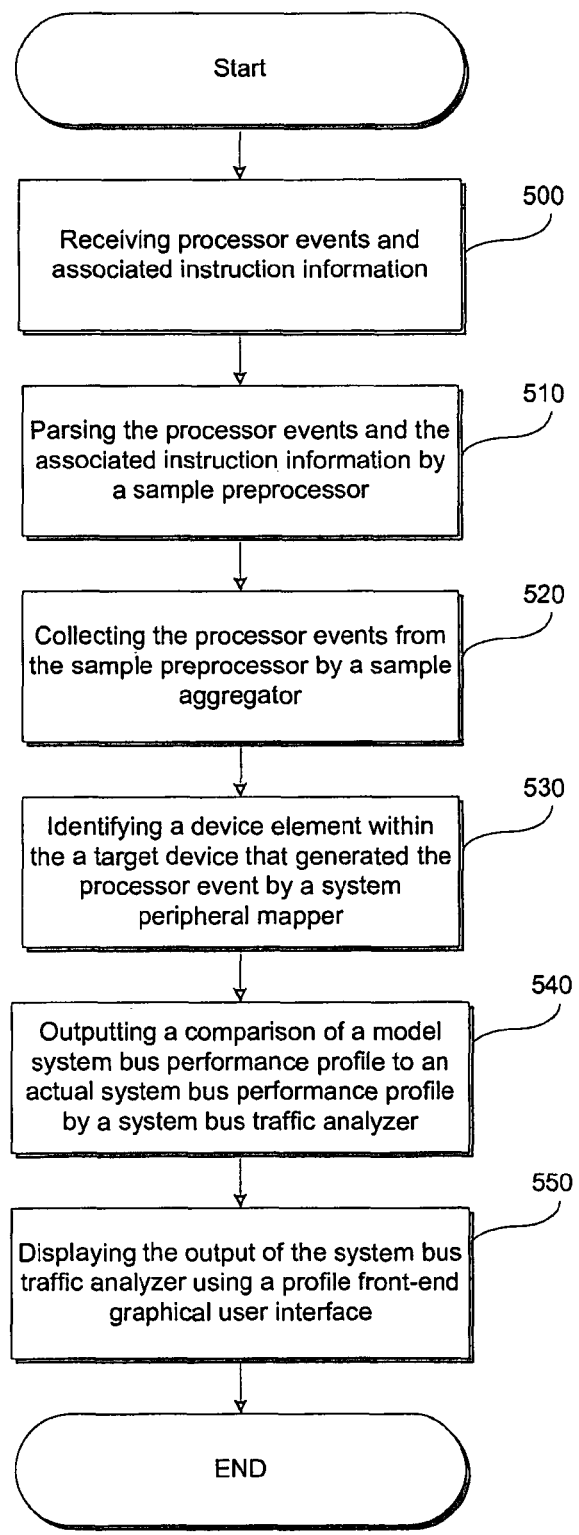
FIG. 5 illustrates a flow chart of an exemplary method of generating a performance profile of system bus traffic using a host consistent with some embodiments of the present invention.

FIG. 5 illustrates a flow chart of an exemplary method of generating a performance profile of system bus 104 in SoC target 100 using host 110 consistent with some embodiments of the present invention. In step 500, host 110 receives processor events and associated instruction information using sample preprocessor 112-A. In step 510, sample preprocessor 112-A parses and routes the processor events and instruction information from the incoming data stream. Processor events from sample preprocessor 112-A are received by sample aggregator 112-B in step 520.

In step 530, system peripheral mapper 112-C identifies which device element within target SoC 100 generated the corresponding processor event based on instruction information received from sample preprocessor 112-A and device database 112-D. In some embodiments, device database 112-D may include a mapping of physical addresses to the corresponding device element within target SoC 100.

In step 540, system bus traffic analyzer 116 produces a model system performance profile and a comparison of the model system performance profile and the actual system performance profile. Here, the model system performance profile may be based on the instruction information and associated device information received from system peripheral mapper 112-C and SoC model 300. The device information, for example, may include the data size and associated source and destination device element addresses within target SoC 100. In some embodiments, SoC model 300 may include a description of the interconnect structure within the target SoC 100. In step 550, front-end graphical user interface (GUI) 114 displays the processor events received from sample aggregator 112-B and the performance profile comparison produced by system bus traffic analyzer 116.

The methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Other embodiments of the inventions will be apparent to those skilled in the art from consideration of the specification and practice of the inventions disclosed herein. It is intended that the specification and examples be considered as exemplary only, with a true scope and spirit of the invention being indicated by the following claims.

What is claimed is:

1. A method for generating a performance profile of traffic on a system bus of a target device, the method comprising:
    receiving a plurality of processor events and respective instruction information associated with each processor event, each respective instruction information including a data address;
    identifying a device element from a plurality of device elements for each of the plurality of processor events based on comparing the respective data addresses to a list of device addresses in a device database;
    generating a destination address data size pair associated with each device element identified;
    generating an actual performance profile of the system bus by sampling the destination address data size pairs;
    displaying the actual performance profile of the system bus;
    generating a model performance profile comprising a theoretical peak throughput of the system bus, wherein the model performance profile is based, at least in part, on a device model; and
    identifying potential performance bottlenecks in the system bus based, at least in part, on comparing the actual performance profile of the system bus with the model performance profile.

2. The method of claim 1, wherein said comparing further comprises comparing the actual performance profile of the system bus with the model performance profile using a front-end graphical user interface.

3. The method of claim 1, wherein the device model comprises the device database, and the device database describes an infrastructure of the target device.

4. A system for profiling a performance of a system bus in a target device, the system comprising:
    a performance monitoring unit configured to capture a plurality of processor events, wherein the performance monitoring unit is coupled to a processor configured to execute an interrupt service routine that is configured to identify an instruction pointer associated with a processor event captured by the performance monitoring unit, wherein the performance monitoring unit generates an interrupt based at least in part on capturing a processor event of the plurality of processor events;
    an instruction analyzer coupled to the performance monitoring unit, wherein the instruction analyzer is configured to determine, based on the instruction pointer identified by the interrupt service routine, a memory address of an instruction associated with the interrupt; and
    a sample collector coupled to the instruction analyzer, wherein the sample collector is configured to
        transmit, from the instruction analyzer to a host, (i) the processor event that generates the interrupt and (ii) information associated with the instruction, and
        enable the host to (i) generate an actual performance profile of the system bus, (ii) compare the actual performance profile of the system bus with a model performance profile comprising a theoretical peak throughput of the system bus, and (iii) identify potential performance bottlenecks in the system bus based, at least in part, on the comparing the actual performance profile of the system bus with the model performance profile.

5. The system of claim 4, wherein the performance monitoring unit is configured to generate an interrupt for each of the plurality of processor events that exceeds a user-defined threshold.

6. The system of claim 4, wherein the instruction analyzer is configured to determine the information associated with the instruction based on i) an application code and ii) the instruction pointer.

7. The system of claim 4, further comprising:
    an address converter configured to convert, based on a page table, a virtual memory address of the instruction associated with the interrupt to a physical memory address.

8. The system of claim 4, wherein the information associated with the instruction comprises at least one of a virtual memory address, a physical data address, and a data size corresponding to the instruction associated with the interrupt.

9. The system of claim 4, wherein the comparison is based on a plurality of interrupts generated by respective processor events.

10. The system of claim 4, wherein the device database comprises physical addresses of a plurality of device elements.

11. The system of claim 4, wherein the model performance profile is generated based on a device model.

12. The system of claim 11, wherein the device model comprises the device database, and the device database describes an infrastructure of the target device.

13. A method for analyzing a system bus in a system on a chip, the method comprising:
    capturing a processor event from the system bus;
    generating an interrupt for the processor event when a threshold defining a range of values associated with the processor event is satisfied;
    collecting instruction information associated with the processor event that generated the interrupt; and
    transferring the processor event and the instruction information to a host, to enable the host to
        generate an actual performance profile of the system bus from i) the processor event and ii) the instruction information,
        compare the actual performance profile of the system bus with a model performance profile comprising a theoretical peak throughput of the system bus, and
        identify potential performance bottlenecks in the system bus based, at least in part, on the comparing the actual performance profile of the system bus with the model performance profile.

14. The method of claim 13, further comprising identifying an instruction pointer associated with the processor event that generated the interrupt.

15. The method of claim 14, further comprising determining the instruction information based on at least one of an application code and the instruction pointer.

16. The method of claim 13, further comprising converting, based on a page table, a virtual memory address of an instruction associated with the processor event to a physical memory address.

* * * * *